United States Patent [19]
Anderson

[11] Patent Number: 5,800,301
[45] Date of Patent: Sep. 1, 1998

[54] CHAIN ASSEMBLY USING FORMED BUSHINGS WITH INVERTED TEETH

[75] Inventor: David P. Anderson, Ithaca, N.Y.

[73] Assignee: Borg-Warner Automotive, Inc., Sterling Heights, Mich.

[21] Appl. No.: 853,835

[22] Filed: May 9, 1997

[51] Int. Cl.⁶ ........................................ F16G 13/04
[52] U.S. Cl. .................. 474/213; 474/231; 474/157
[58] Field of Search ............................ 474/155, 156, 474/157, 206, 212–217, 231, 234

[56] References Cited

U.S. PATENT DOCUMENTS

| | | |
|---|---|---|
| 953,114 | 3/1910 | Belcher ............................ 474/213 |
| 995,137 | 6/1911 | Hayward . |
| 1,689,556 | 10/1928 | Nichols . |
| 1,720,852 | 7/1929 | Nichols . |
| 2,385,923 | 10/1945 | Klaucke et al. . |
| 2,667,792 | 2/1954 | Bendall ............................ 474/157 |
| 4,114,467 | 9/1978 | Petershack ..................... 474/231 X |
| 4,186,617 | 2/1980 | Avramidis et al. ................ 74/245 |
| 4,342,560 | 8/1982 | Ledvina et al. ................. 474/157 |
| 4,642,074 | 2/1987 | Phillips ........................... 474/156 |
| 4,758,210 | 7/1988 | Ledvina .......................... 474/212 |
| 5,092,822 | 3/1992 | Wakabayashi .................. 474/209 |
| 5,226,856 | 7/1993 | Iacchetta et al. ................ 474/207 |
| 5,425,679 | 6/1995 | Utz .................................. 474/91 |
| 5,427,580 | 6/1995 | Ledvina et al. ................... 474/84 |

*Primary Examiner*—Thomas R. Hannon
*Attorney, Agent, or Firm*—Sidley & Austin; Greg Dziegielewski

[57] ABSTRACT

A roller chain is provided with a bushing with a silent chain link profile. The bushing has a pair of depending toes which engage the teeth of a sprocket to provide power transmission.

9 Claims, 4 Drawing Sheets

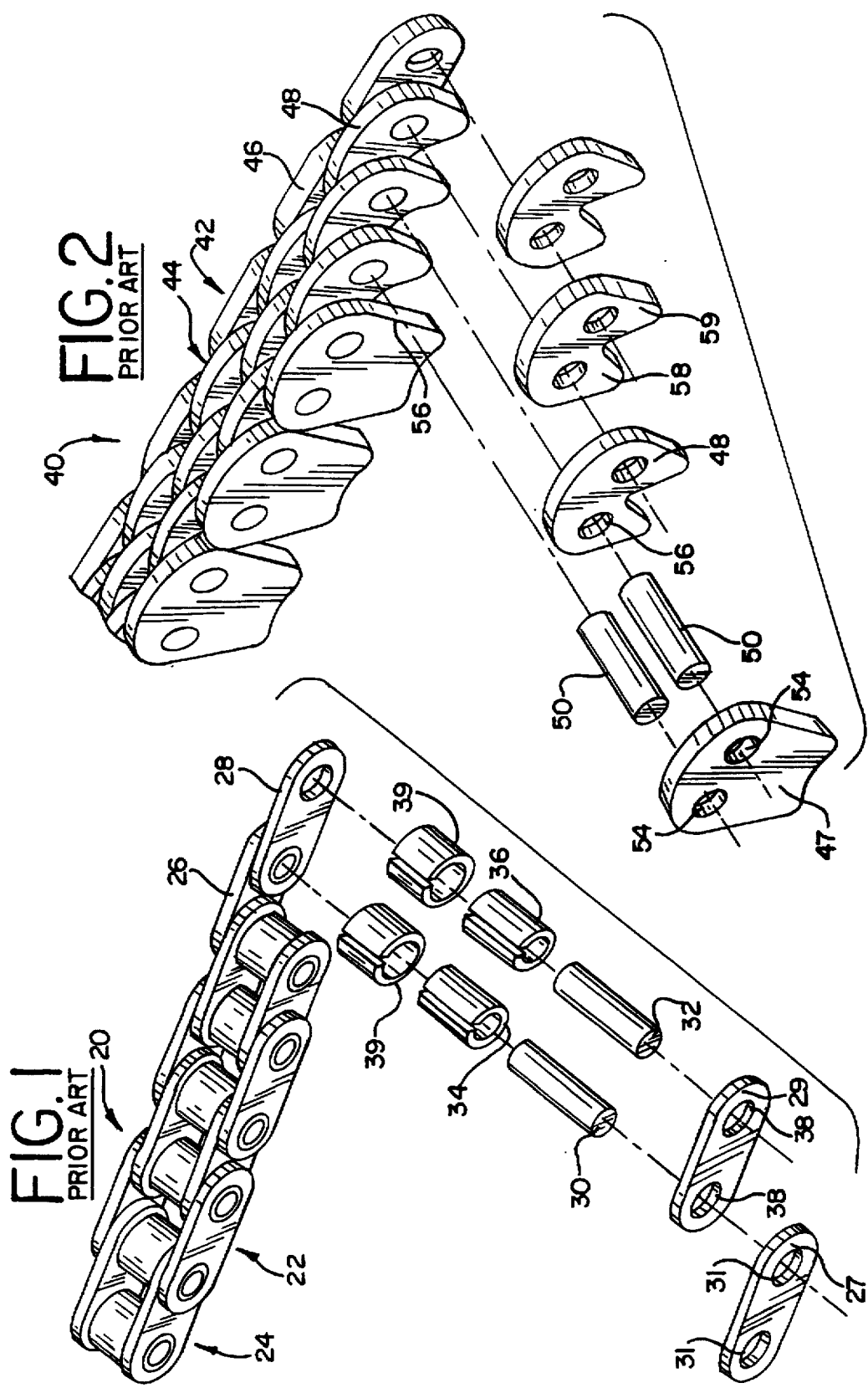

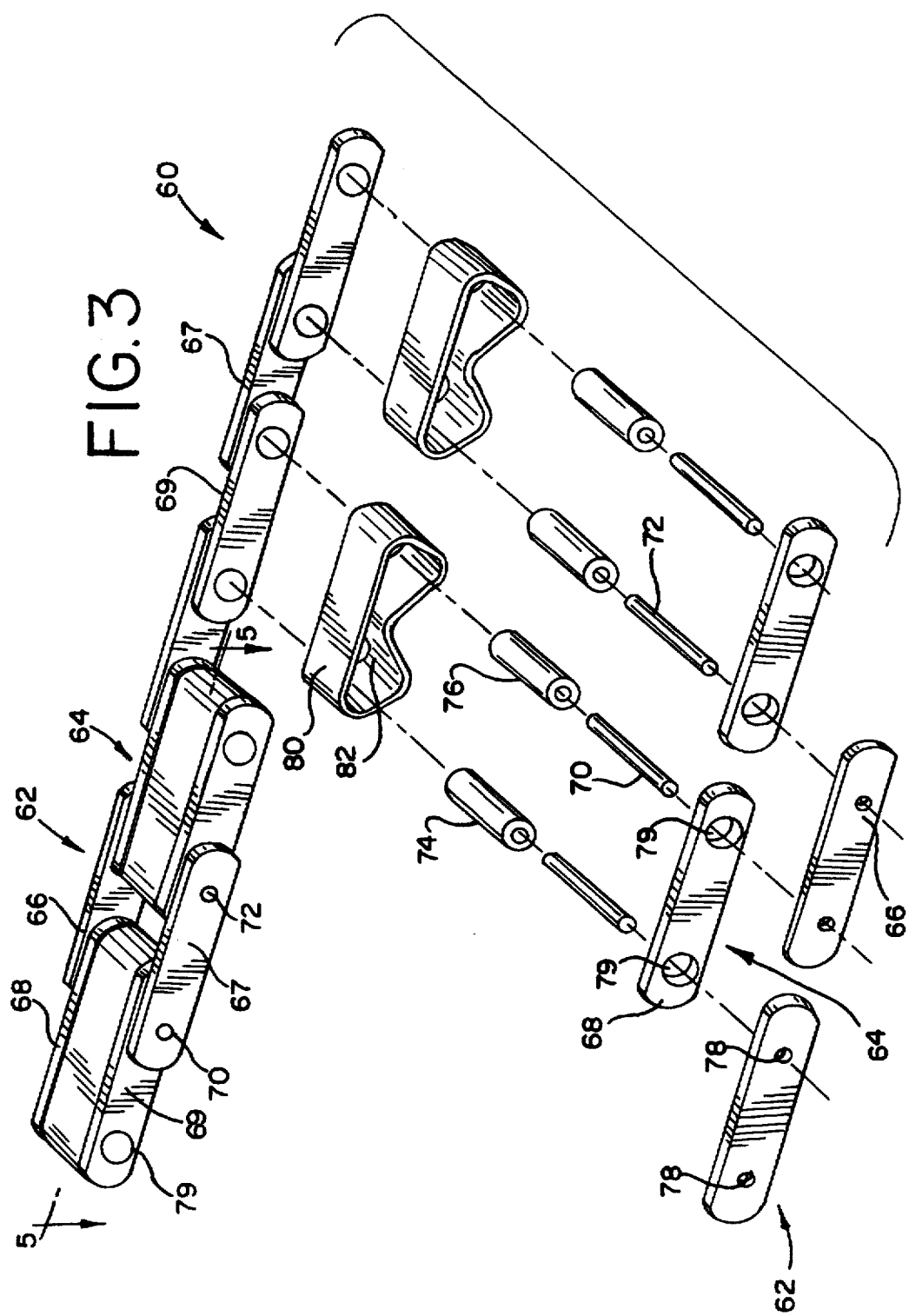

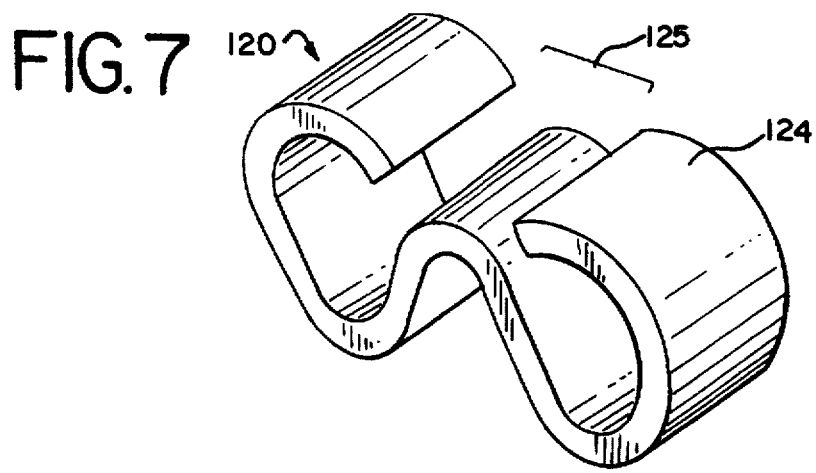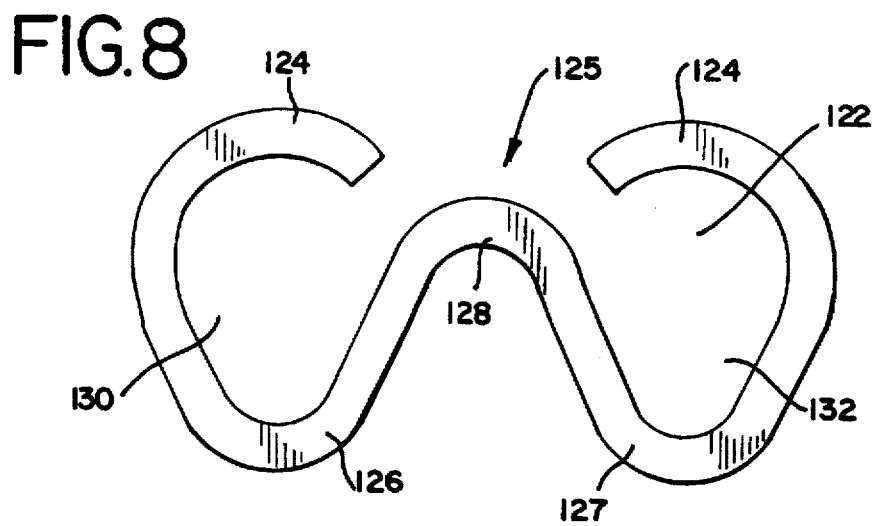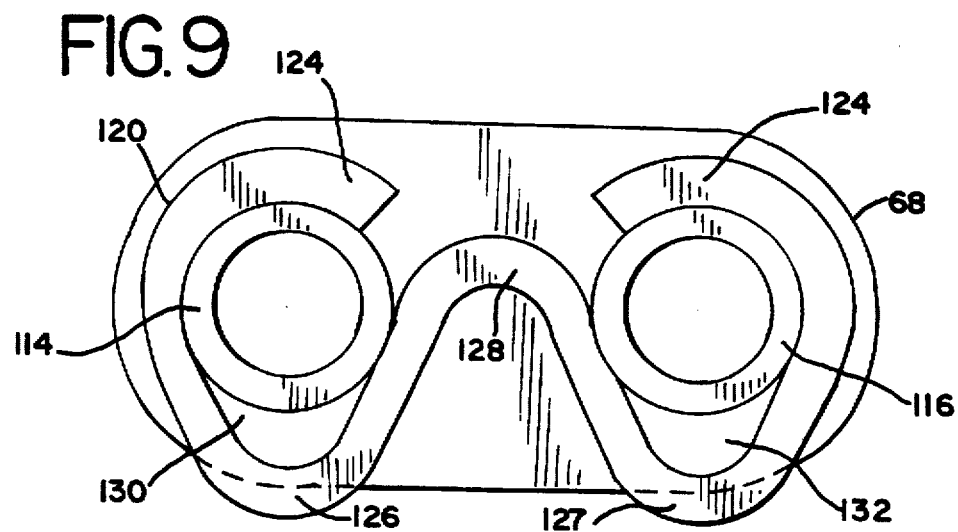

CHAIN ASSEMBLY USING FORMED BUSHINGS WITH INVERTED TEETH

FIELD OF THE INVENTION

The present invention relates generally to power transmission chains. The invention has particular application to power transmission chains of the silent chain or roller chain variety, which are used in engine timing applications as well as in industrial applications.

DESCRIPTION OF THE PRIOR ART

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of chain is known as a "silent chain." A typical silent chain consists of interleaved sets of inverted tooth links. A set or rank of links is assembled from several links positioned alongside of or adjacent to each other. The links are connected by pivot means, which are typically round pins received in a pair of apertures. An example of a silent chain is found in U.S. Pat. No. 4,342,560, which is incorporated herein by reference.

A conventional silent chain typically includes both guide links and inverted tooth links. The guide links are positioned on the outside edges of alternate sets of links. The guide links typically act to position the chain laterally on the sprocket. Guide links typically do not mesh with the sprocket.

The inverted tooth links—or "sprocket-engaging" links—provide the transfer of power between the chain and sprocket. Each inverted tooth link typically includes a pair of apertures and a pair of depending toes. Each toe is defined by an inside flank and an outside flank. The inside flanks are joined at a crotch. The inverted tooth links are typically designed so that the links contact the sprocket teeth to transfer power between the chain assembly and the sprocket. The inverted tooth links or driving links contact the sprocket teeth along their inside flanks or their outside flanks or combinations of both flanks. The contacts between the links and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket is mounted on the camshaft. The rotation of a camshaft is thus controlled by and dependent on the rotation of the crankshaft through the chain. A chain for an engine timing drive application is shown in U.S. Pat. No. 4,758,210, which is incorporated herein by reference.

Another type of chain is known as a "roller chain." A typical roller chain consists of alternate inner links and outer links. The inner links, which are also known as "bushing" links, consist of spaced link plates with bushings tightly received in apertures at each end of the link plates. The outer links, which are also known as "guide" links, consist of spaced link plates with pins tightly received in apertures at each end of the link plates. The bushings freely rotate about the pins to pivotally connect the outer links to the inner links in alternate arrangement. Rollers may be provided about the bushings, and when the roller chain is wrapped about a sprocket, the teeth of the sprocket are received between the laterally spaced link plates and the longitudinally spaced rollers. Examples of roller chains are found in U.S. Pat. Nos. 4,186,617 and 5,226,856, which are both incorporated herein by reference.

A conventional roller chain drive is comprised of an endless roller chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket is mounted on the camshaft. The rotation of a camshaft is thus controlled by and dependent on the rotation of the crankshaft through the chain. Various types of engine timing systems and configurations, which are suitable for roller and inverted tooth chain assemblies, are shown in U.S. Pat. No. 5,427,580, which is incorporated herein by reference.

Noise is associated with chain drives, and is generated by a variety of sources. In roller chain drives, noise can be generated from the impact of the collision between the chain and the sprocket at the onset of meshing. The loudness of the impact sound is affected by, among other things, the impact velocity between the chain and the sprocket and the impact of the steel rollers or bushings against the steel or powered metal sprockets.

Roller chains can be used in automotive applications, but are usually limited to applications where noise generation is not of primary concern. Roller chains are characterized by components with increased resistance to wear.

A silent chain is superior to a roller chain with regards to noise and vibration characteristics. However, a typical silent chain suffers from inherent design weaknesses arising from mass, cost, pin and link wear, guide wear and efficiency, and sprocket wear. Silent chains typically are of higher mass than roller chains, and are therefore typically more costly to produce. The pins and links contact in an interrupted fashion, providing a non-uniform bearing surface susceptible to high wear in abrasive environments. Similar to the pin and link bearing surface, the link surfaces engaging the sprocket are also interrupted. This creates high contact pressures on engagement and results in spalling type wear.

The interlaced design of a typical silent chain results in a tight lateral fit between the link plates. As a result, it is difficult to develop an oil film on the back side of the chain where there is contact with guide wear surfaces. Oil cannot easily penetrate the chain and lubricate the contact surfaces.

SUMMARY OF THE INVENTION

The present invention provides a new roller chain assembly having the engagement properties of a silent chain as a result of a bushing with a silent chain link profile. The hybrid chain design of the present invention incorporates the superior noise and vibration characteristics of a typical silent chain, as well as advantages of a typical roller chain, including high stiffness and low mass.

In one embodiment of the present invention, the chain assembly includes a series of interleaved outer and inner links. Each outer link has a pair of outer link plates. Each outer link plate is fixedly mounted to a pair of spaced pin members and has a pair of apertures to receive the pin members. Each inner link plate is fixedly mounted to a pair of rounded bushings and has a pair of apertures for receiving the rounded bushings. The rounded bushings are rotatably mounted to turn about the pin members. In contrast to a conventional roller chain, the chain of the present invention includes a formed bushing that is rotatably mounted about the rounded bushings. The formed bushings each include a pair of depending teeth or toes, which engage the sprocket teeth to provide power transmission.

In one embodiment, the present invention includes a chain and sprocket assembly. The sprocket assembly includes sprocket teeth that are constructed to mesh with the depending toes of the formed bushing of the chain assembly.

The present invention provides the high strength to mass ratio and the high stiffness to mass ratio associated with roller chains. The present invention is also characterized by its low mass, which provides improved suitability for high speed applications. Further, the present invention requires fewer components than a typical roller chain which, coupled with its low mass, results in lower cost.

The nature by which the chain engages the sprocket in the present invention results in the low noise and vibration usually associated with silent chains. Because the present invention includes a continuous engagement surface rather than several surfaces of varying dimensions, it is subject to lower contact pressure with the sprocket surface than typical silent chains. The resulting impact vectors also decrease the likelihood of impact failures associated with roller chains.

The present invention also provides more space on the backside of the chain for lubricating oil to penetrate the chain and provide an oil film for guide surface wear. The ability of lubricating oil to more easily penetrate the chain can result in improved efficiency over typical silent chains with tightly interlaced link plates.

BRIEF DESCRIPTION OF THE DRAWINGS

For a more complete understanding of the invention, one should refer to the embodiments illustrated in greater detail in the accompanying drawings. In the drawings, which are not to scale:

FIG. 1 is a perspective view of a roller chain of the prior art, shown partly in exploded view;

FIG. 2 is a perspective view of a silent chain of the prior art, shown partly in exploded view;

FIG. 3 is a perspective view of a silent chain having the formed bushing feature of the present invention, shown partly in exploded view;

FIG. 7 is a side perspective view of a formed bushing in one embodiment of the present invention;

FIG. 8 is a side view of a formed bushing in one embodiment of the present invention; and FIG. 9 is a side sectional view of a formed bushing and inner link plate in one embodiment of the present invention.

DETAILED DESCRIPTION OF THE PREFERRED EMBODIMENTS

Figure 4:
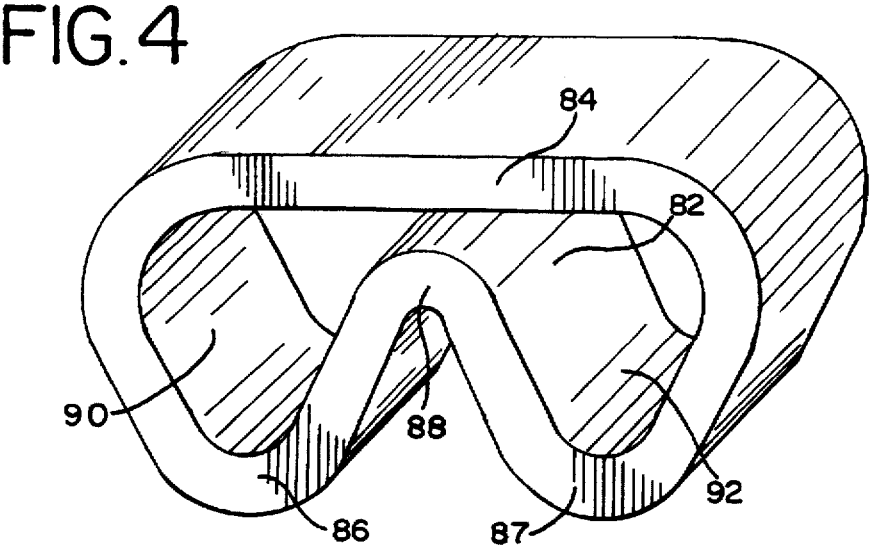
FIG. 4 is a side perspective view of a formed bushing in one embodiment of the present invention.

Turning now to the drawings, FIG. 1 illustrates a portion of a roller chain of the prior art generally at 20. The chain 20 is constructed by a series of links, pins, bushing and rollers. The chain includes a series of interleaved outer links 22 and inner links 24. The outer links are formed by a pair of outer link plates 26 and 27. The inner links are formed by a pair of inner link plates 28 and 29.

The outer link plates 26 and 27 are fixed to a pair of pin members 30 and 32. The pin members are spaced apart and fitted through apertures 31 in the outer link plates 26 and 27. The inner links plates 28 and 29 are fixed to a pair of bushings 34 and 36. The bushings 34 and 36 are generally cylindrical in shape. The bushings 34 and 36 are spaced apart and fitted through apertures 38 in the inner link plates 28 and 29. The bushings 34 and 36 are typically secured in the inner link plates 28 and 29 by a press fit, or by welding, caulking, or any other means known in the art.

The bushings 34 and 36 are mounted about the pin members 30 and 32 and are freely rotatable about the pin members 30 and 32. Rotation of the bushings 34 and 36 about the pin members 30 and 32 allows pivoting of the outer links 22 with respect to the inner links 24. In the prior art chain shown in FIG. 1, rollers 39 are mounted about the bushings 34 and 36 and are freely rotatable about the bushings 34 and 36. The rollers 39 are generally cylindrical in shape and contact the sprocket teeth of the sprocket assembly (not shown).

Thus, the chain of FIG. 1 is constructed by inserting the pin member within the bushing and the bushing within the roller. The bushings are secured to a pair of inner link plates and the pins are then secured to a pair of outer link plates. The inner links and outer links are alternated in series to form an endless chain. The length of the chain and exact number of links is determined by, among other things, the application and center distance between the sprockets.

FIG. 2 illustrates a silent chain of the prior art generally at 40. The chain 40 is constructed by a series of links and pivot members. The chain includes a series of interleaved guide link rows 42 and inner link rows 44. The guide link rows 42 are formed by a pair of guide link plates 46 and 47. The inner link rows 44 are formed by a series of inner link plates 48. The inner link rows 44 are each interlaced with one set of inner link plates 48 in the guide link row 42 and another set of inner link plates 48 in the non-guide link row.

The guide link plates 46 and 47 are press fit on a pair of pivot members 50. The pivot members 50 are typically secured in the guide link plates 46 and 47 by a press fit within apertures 54 of the guide link plates 46 and 47. The pivot members 50 are rotatably received in apertures 56 of the inner link plates 48. The inner link plates 48 are each defined by a pair of spaced toes 58 and 59. The spaced toes 58 and 59 contact and engage the sprocket teeth of the sprocket assembly (not shown).

Thus, the chain of FIG. 2 is constructed by inserting the pivot members within the apertures of the inner link plates, and securing the pivot members within the apertures of the guide link plates. The guide link plates maintain the lateral alignment of the chain on the sprocket, while the inner link plates engage the sprocket teeth. The guide link rows are interleaved with the inner link rows and the inner link rows are interlaced with each other to form an endless chain. The length of the chain and the exact number of link rows is determined by, among other things, the application and center distance between the sprockets.

The present invention is directed to providing a chain assembly having the advantages of lower noise generation usually associated with silent chains, and having components with the increased resistance to wear usually associated with roller chains. FIG. 3 illustrates generally at 60 a chain assembly having the formed bushing feature of the present invention. The chain 60 is constructed by a series of links, pins, and bushings.

The complete chain and sprocket assembly (not shown) includes an endlessly connected chain 60 wrapped about at least a pair of sprocket assemblies. The sprocket assemblies are mounted on shafts, such as an engine crankshaft or engine camshaft. The sprocket assemblies may be of unequal diameters and may have an unequal number of teeth of various shapes. The chain and sprocket assembly can also include an idler sprocket.

The chain 60 includes a series of interleaved outer links 62 and inner links 64. The outer links 62 are formed by a pair of outer link plates 66 and 67. The inner links 64 are formed by a pair of inner link plates 68 and 69.

The outer link plates 66 and 67 are fixed to a pair of pin members 70 and 72 by a press fit or by welding, caulking, or any other means known in the art. Pin members 70 and 72 are spaced apart and fitted through apertures 78 in the outer link plates 66 and 67.

The inner link plates 68 and 69 are fixed to a pair of rounded bushings 74 and 76 by a press fit or by welding, caulking, or any other means known in the art. The rounded bushings 74 and 76 are spaced apart and fitted through apertures 79 in the inner link plates 68 and 69.

The rounded bushings 74 and 76 are mounted about the pin members 70 and 72 and are freely rotatable about the pin members 70 and 72. Thus, a rotation of the rounded bushings 74 and 76 about the pin members 70 and 72 allows pivoting of the outer links 62 with respect to the inner links 64.

The formed bushings 80 are mounted about the rounded bushings 74 and 76 and may be freely rotatable about the rounded bushings 74 and 76. The rounded bushings 74 and 76 may also be tightly fit with the formed bushings 80. As shown in FIG. 4, the formed bushings 80 each include a continuous upper edge 84 and a pair of inverted teeth or depending toes 86 and 87. In one embodiment, the depending toes 86 and 87 extend downward from the upper edge 84 of the formed bushing 80. The depending toes 86 and 87 and upper edge 84 define an aperture 82 in which the rounded bushings 74 and 76 are mounted. In another embodiment, the depending toes 86 and 87 define a crotch 88 between them. The crotch 88 divides the aperture 82 into at least two portions 90 and 92. The rounded bushings 74 and 76 are each rotatably mounted in one of the two portions 90 and 92.

FIG. 4 also illustrates the depending toes 86 and 87 each defined by an inside flank 94 and an outside flank 96. The inside flanks 94 are slightly curved and the outside flanks 96 are generally curved for the major parts of their extents. In another embodiment, the inside flanks 94 and outside flanks 96 may be curved or straight, or in any combination or proportion thereof.

FIG. 7 illustrates another embodiment of the present invention, in which the formed bushings 120 each include an upper edge 124 with a split surface, separated by a gap 125. As shown in FIG. 8, the formed bushings 120 include a pair of inverted teeth or depending toes 126 and 127. The depending toes 126 and 127 extend downward from the split-surfaced upper edge 124 of the formed bushing 120. The depending toes 126 and 127 define a crotch 128 between them, and the crotch 128 divides the aperture 122 into at least two portions 130 and 132. As shown in FIG. 9, the formed bushings 120 are aligned with and secured to an inner link plate 68. The rounded bushings 114 and 116 are each rotatably mounted in one of the two portions 130 and 132. The rounded bushings 114 and 116 may also be tightly fit with the formed bushings 120.

Figure 5:
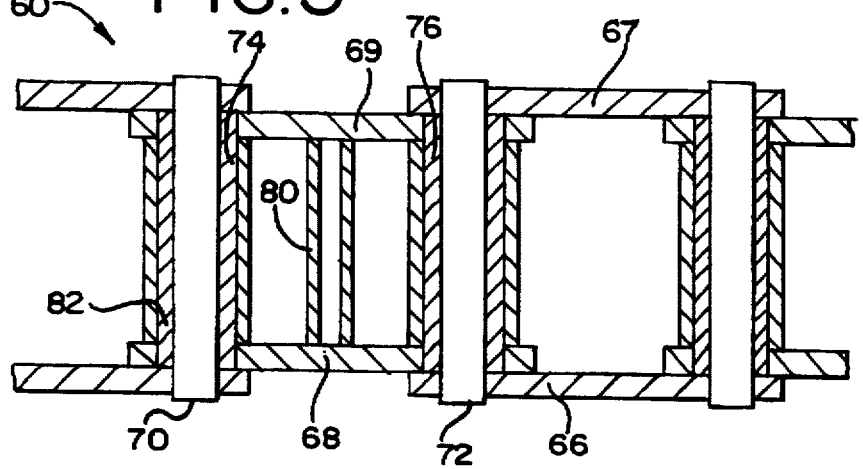
FIG. 5 is a top sectional view, taken on line 5—5 of FIG. 3, of a portion of a chain having the formed bushing feature of the present invention.

Thus, as shown in FIG. 5, the chain assembly 60 is constructed by securing the rounded bushings 74 and 76 to a pair of inner link plates 68 and 69. The pin members 70 and 72 are inserted within the rounded bushings 74 and 76, and secured to a pair of outer link plates 66 and 67. The rounded bushings 74 and 76 are rotatably mounted and received in the aperture 82 of the formed bushing 80. The outer links 62 and inner links 64 are alternated in series to form an endless chain. The length of the chain and exact number of links is determined by, among other things, the application and center distance between the sprocket assemblies.

Figure 6:
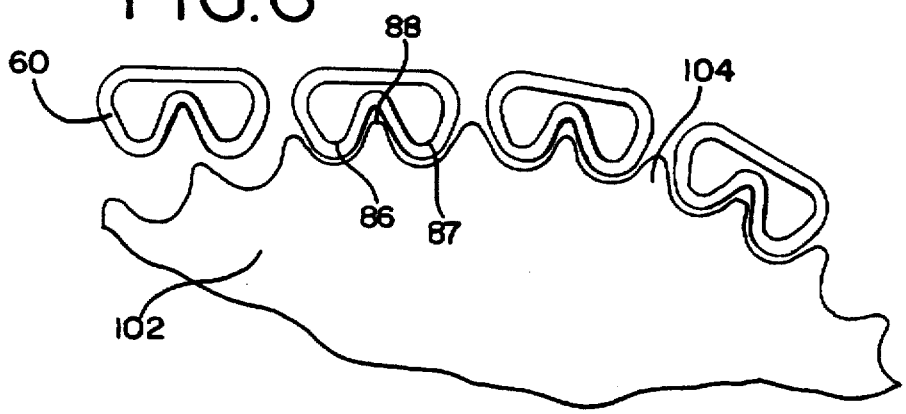
FIG. 6 is a side elevation view, partially broken away, of a portion of a chain and sprocket having the formed bushing feature of the present invention engaging a sprocket assembly.

FIG. 6 illustrates a silent chain and sprocket assembly 100, comprising a sprocket assembly 102 and the chain 60 with the formed bushing feature of the present invention. In operation, the formed bushings 80 of the chain 60 contact and engage the sprocket teeth 104 of the sprocket assembly 102. In one embodiment, the formed bushings 80 include a pair of depending toes 86 and 87, which define a crotch 88. The crotch 88 of the formed bushings 80 receives the sprocket teeth 104 of the sprocket assembly 102.

What is claimed is:

1. A chain assembly, comprising:

a plurality of interleaved outer links and inner links, said outer links each being formed by a pair of outer link plates, said inner links each being formed by a pair of inner link plates;

a pair of pin members fixedly mounted to said outer link plates;

a plurality of bushings of a first type fixedly mounted to said inner link plates, said first type bushings being mounted and freely rotatable about said pin members; and a plurality of bushings of a second type mounted about said first type bushings, said second type bushings each including an upper edge and a pair of spaced toes extending downwardly from said upper edge and forming a crotch therebetween, said toes and said upper edge defining an aperture in said second type bushings, said crotch dividing said aperture into two separate portions;

said first type bushings each being seated in one of said portions of said aperture.

2. A chain assembly according to claim 1, wherein:

said second type bushings each include two upper surfaces, said upper surfaces being spaced apart from one another, each upper surface being connected to a downwardly extending toe.

3. A chain assembly according to claim 1, wherein:

said upper edge of said second type bushings contacts both of said inner link plates that said second type bushing extends between.

4. A chain and sprocket assembly, comprising:

a chain assembly, said chain assembly having a plurality of interleaved outer links and inner links, said outer links each being formed by a pair of outer link plates, said inner links each being formed by a pair of inner link plates;

a pair of pin members fixedly mounted to said outer link plates;

a plurality of bushings of a first type fixedly mounted to said inner link plates, said first type bushings being mounted and freely rotatable about said pin members;

a plurality of bushings of a second type mounted about said first type bushings, said second type bushings each including an upper edge and a pair of spaced toes extending downwardly from said upper edge and forming a crotch therebetween, said toes and said upper edge defining an aperture in said second type bushings, said crotch dividing said aperture into two separate portions;

said first type bushings each being seated in one of said portions of said aperture; and a plurality of sprockets, said sprockets each having a plurality of teeth, said sprocket teeth contacting said bushing toes to provide a power transmission therebetween.

5. A chain and sprocket assembly according to claim 4, wherein:

said upper edge of said second type bushings contacts both of said inner link plates that said second type bushing extends between.

6. A chain and sprocket assembly, comprising:

a chain assembly, said chain assembly having a plurality of interleaved outer links and inner links, said outer links each being formed by a pair of outer link plates, said inner links each being formed by a pair of inner link plates:

a pair of pin members fixedly mounted to said outer link plates;

a plurality of bushings of a first type fixedly mounted to said inner link plates, said first type bushings being mounted and freely rotatable about said pin members;

a plurality of bushings of a second type mounted about said first type bushings, said second type bushings each including a pair of spaced toes; and a plurality of sprockets, said sprockets each having a plurality of teeth, said sprocket teeth contacting said bushing toes to provide a power transmission therebetween, said second type bushings each include two upper surfaces, said upper surfaces being spaced apart from one another, each upper surface being connected to a downwardly extending toe; and said pair of spaced toes extend downward from said upper edge.

7. A chain and sprocket assembly according to claim 6, wherein:

said toes and said upper edge define an aperture in said second type bushing; and said first type bushings are seated in said aperture.

8. A chain and sprocket assembly according to claim 6, wherein:

said toes form a crotch therebetween, said crotch dividing said aperture into two separate portions; and said first type bushings each are each seated in one of said portions of said aperture.

9. A chain and sprocket assembly according to claim 6, wherein:

said upper edge of said second type bushings contacts both of said inner link plates that said second type bushing extends between.

* * * * *